United States Patent [19]

Hendricks et al.

[11] Patent Number: 4,705,889
[45] Date of Patent: Nov. 10, 1987

[54] AMINOSUCCINIC ACID DERIVATIVES AND THEIR USE AS EMULSIFIERS FOR POLYMER DISPERSIONS

[75] Inventors: Udo W. Hendricks, Odenthal; Adolf Schmidt, Colonge, both of Fed. Rep. of Germany

[73] Assignee: Bayer Aktiengesellschaft, Leverkusen, Fed. Rep. of Germany

[21] Appl. No.: 837,157

[22] Filed: Mar. 7, 1986

[30] Foreign Application Priority Data

Mar. 19, 1985 [DE] Fed. Rep. of Germany ....... 3509822

[51] Int. Cl.$^4$ ............................................. C07C 101/26
[52] U.S. Cl. ................................. 562/564; 260/501.11; 526/215; 558/447; 560/169; 562/565; 564/491
[58] Field of Search ............................... 562/564, 565; 260/501.17, 501.11

[56] References Cited

U.S. PATENT DOCUMENTS

| | | | |
|---|---|---|---|
| 2,761,874 | 9/1956 | Bersworth | 562/565 |
| 3,077,487 | 2/1963 | Ramsey et al. | 562/565 |
| 3,158,635 | 11/1964 | Kezerian | 562/565 |
| 3,718,597 | 2/1973 | Werdehausen | 562/565 |

FOREIGN PATENT DOCUMENTS

| | | |
|---|---|---|
| 2341045 | 3/1974 | Fed. Rep. of Germany . |
| 3149201 | 7/1982 | Fed. Rep. of Germany . |
| 40-13846 | 7/1965 | Japan ................................ 562/565 |
| 40-16350 | 7/1965 | Japan ................................ 562/565 |
| 40-16351 | 7/1965 | Japan ................................ 562/565 |
| 1228735 | 4/1971 | United Kingdom ................ 562/565 |
| 2005663 | 4/1979 | United Kingdom . |
| 558905 | 8/1977 | U.S.S.R. .............................. 562/565 |
| 765259 | 9/1980 | U.S.S.R. .............................. 562/565 |

*Primary Examiner*—Michael L. Shippen
*Attorney, Agent, or Firm*—Connolly and Hutz

[57] ABSTRACT

Aminosuccinic acid derivatives corresponding to the following general formula (I):

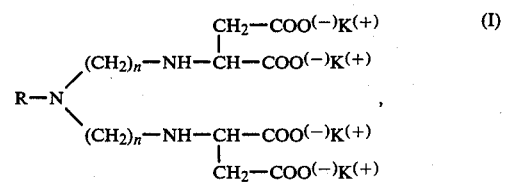

wherein
R represents an alkyl or alkenyl group having from 10 to 22 carbon atoms which may be branched and/or interupted by one or more oxygen atoms;
n represents the number 2 or 3; and
K represents hyrogen or a cation;
a process for their preparation and their use.

1 Claim, No Drawings

AMINOSUCCINIC ACID DERIVATIVES AND THEIR USE AS EMULSIFIERS FOR POLYMER DISPERSIONS

This invention relates to aminosuccinic acid derivatives corresponding to the following general formula (I):

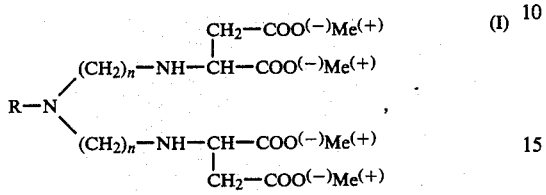

wherein
R represents an alkyl or alkenyl group having from 10 to 22 carbon atoms which may be branched and/or interrupted by one or more oxygen atoms;
n represents the number 2 or 3; and
$Me^{(+)}$ represents hydrogen or a monovalent cation or 2 $Me^{(+)}$ represents a divalent cation.

The dodecyl, tetradecyl, hexadecyl, octadecyl, octadecenyl, dodecyloxypropyl and octadecyloxypropyl groups are examples of groups represented by R.

The cation $Me^{(+)}$ may be an alkali metal, alkaline earth metal, ammonium, mono-, di- or tri-alkylammonium ion or an alkanolammonium ion, e.g. the hydroxyethylammonium ion, hydroxypropylammonium ion, bis-(hydroxyethyl)-ammonium ion or tris-(hydroxyethyl)-ammonium ion.

The present invention also relates to the preparation of such compounds and their use as emulsifiers for emulsifying solid and liquid substances, in particular as auxiliary agents for emulsion and dispersion polymerisation of monomers capable of radical polymerisation, and as additives for improving the shearing stability of disperse systems.

Compounds (I) wherein $Me^{(+)}$ represents an alkali metal or alkaline earth metal ion may be obtained by the addition of maleic acid mono- or di-alkyl esters corresponding to the following general formula (II):

or of fumaric acid mono- or di-alkyl esters corresponding to the following general formula (III):

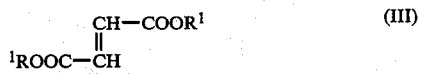

wherein one of the groups $R^1$ represents an alkyl group having from 1 to 4 carbon atoms and the other represents hydrogen or an alkyl group having from 1 to 4 carbon atoms; to bis-(ω-aminoalkyl)-alkylamines corresponding to the following general formula (IV):

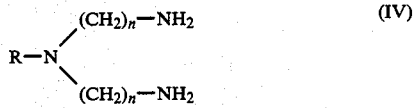

wherein R and n are as defined above; to form esters corresponding to the following general formula (V):

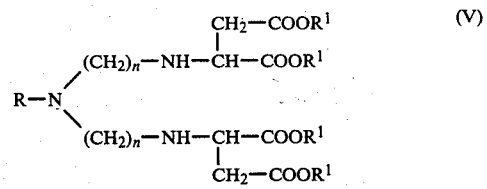

wherein R, n and $R^1$ are as defined above; followed by hydrolysis of these esters using alkali metal or alkaline earth metal hydroxides.

Compounds (I) wherein $Me^{(+)}$ represents an ammonium ion, an alkylammonium ion or an alkanolammonium ion may be obtained from the corresponding alkali metal or alkaline earth metal salts by preparing the free carboxylic acids (I) in known manner by the addition of at least equivalent quantities of mineral acids, such as hydrochloric acid or or sulphuric acid, and then isolating the free carboxylic acid and neutralizing it with ammonia, an alkylamine or an alkanolamine.

Bis-(ω-aminoalkyl)-alkylamines (IV) are known and their preparation has been described, for example, in U.S. Pat. No. 3,615,797 and DE-OS No. 3,145,733. The addition of maleic or fumaric acid esters to amines (IV) may be carried out by known methods with or without solvents, such as lower alcohols, ketones, ethers or aromatic hydrocarbons, at temperatures of from 20° to 120° C., preferably from 40° to 60° C. The molar ratio of maleic or fumaric acid ester to the amines (IV) should be at least 2:1, preferably from 2.1:1 to 2.0:1.

The esters (V) may be hydrolysed using aqueous or alcoholic solutions of alkali metal or alkaline earth metal hydroxides, optionally with the addition of solvents, such as lower alcohols, preferably at elevated temperatures. The molar ratio of alkali metal hydroxide to ester (V) used for this reaction should be at least 4:1, while the molar ratio of alkaline earth metal hydroxide to ester should be at least 2:1. The new emulsifiers may be used for the preparation of synthetic resin dispersions which are resistant to shearing.

Synthetic resin dispersions should have a high shearing stability so that as little coagulate as possible will form in the reactors and conveyor devices. Although the shearing stability may be improved by increasing the concentration of emulsifier, this leads to increased foaming and impairs the properties of the product for practical application (in particular the water resistance of the films and coatings obtained from these dispersions).

Although the emulsifiers according to the present invention improve the shearing stability, they do not impair the capacity of dispersions for coagulating. These emulsifiers are suitable in general for the emulsion polymerisation of known radically polymerisable monomers, as well as for their copolymerisation.

The following are examples of suitable monomers: ethylene, butadiene, chloroprene, styrene, α-methylstyrene, esters of acrylic or methacrylic acid and lower alcohols, e.g. methylacrylate, ethylacrylate, butylacrylate, methylmethacrylate, ethylmethacrylate or butylmethacrylate, vinyl acetate, vinyl versate, vinyl propionate, vinyl chloride or copolymerisable mixtures of these monomers.

When emulsion polymerisation is carried out batchwise, the whole quantity of emulsifier according to the present invention may be introduced into the reaction vessel together with the water before the other components are added or, alternatively, only a portion of the emulsifier may be introduced together with the monomer or monomer mixture, the remainder being added subsequently.

The emulsifiers are generally used in quantities of from 0.5 to 8%, by weight, based on the quantity of monomer put into the process.

When emulsion polymerisation is carried out semicontinuously, the monomers are fed into the system when it is in the process of polymerising. This method may be employed with or without the addition of a nuclear latex (see e.g. J. Snuparek and F. Krska, Journal of Applied Polymer Science, Vol. 20, 1753-1764 (1978). The emulsifiers according to the present invention may be used not only for forming the nuclear latex but also for emulsifying the monomers which are to be added subsequently. They may also be added separately from the monomer.

In continuous emulsion polymerisation, the emulsifiers according to the present invention may be fed into the first reactor and participate in the formation of particles. It is also possible and indeed preferable to form the latex particles using known emulsifiers and not to add the emulsifiers according to the present invention until the risk of coagulation by shearing stresses arises due to depletion of emulsifier in the polymerising system. Shearing stress may occur at the parts of the apparatus where coiled tubes, stirrers, pipes or discharge devices for the latex are installed. Where a cascade of reaction vessels is used, the emulsifiers according to the present invention are preferably fed into the last reactors, while in arrangements consisting mainly of a preliminary reactor (feeder) and a main reactor (in most cases a stirrer autoclave (CSTR)), the emulsifiers according to the present invention are fed into the main reactor.

A previously-prepared dispersion which is sensitive to shearing stress may also be treated with the emulsifiers according to the present invention, exceptionally high shearing stability being imparted to such a dispersion or even being rendered redispersible. For this purpose it is generally sufficient to add quite a small quantity of emulsifier, amounting to from 0.2 to 0.5%, by weight, based on the quantity of polymer in the dispersion.

Dispersions prepared in the presence of the emulsifiers according to the present invention have hardly any tendency to foam. This is an advantage for demonomerization. Dispersions which are extremely resistant to shearing stresses in the alkaline pH range may be sensitized by the addition of substances which are acid in reaction so that they agglomerate and are finally completely coagulated. Precipitation of the polymers may also be carried out by means of metal ions, in particular polyvalent ions, such as Ca ions, Mg ions or Al ions. The conditions suitable for precipitation may easily be determined experimentally so that this precipitation may be controlled to produce a coagulate in a finely divided form which is free from lumps and may easily be filtered. Rapid lowering of pH combined with high solids concentrations generally results in coagulate particles which are too coarse.

The emulsifiers according to the present invention form complexes with divalent and higher valent metal ions. Thus, in contrast to the conventional carboxylate soaps, they manifest excellent tolerance to $Ca^{2+}$ and $Mg^{2+}$ ions.

In the Examples which follow, the parts given are parts by weight unless otherwise indicated.

EXAMPLE 1

135 parts of dimethylmaleate were added at from 30° to 40° C. to 182 parts of a mixture of bis-(3-aminopropyl)alkylamines corresponding to the following formula:

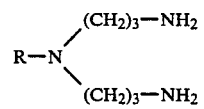

(composition of the alkyl group R in mol-%: $C_{12}$ alkyl 1%, $C_{14}$ alkyl 2%, $C_{16}$ alkyl 30%, $C_{18}$ alkyl 66%, $C_{20}$ alkyl 1%), and the reaction mixture was then stirred at this temperature for 6 hours. 310 parts of a viscous liquid were obtained after clarification by filtration. No maleic acid ester was found on thin layer chromatographic investigation.

Basic nitrogen: Calculated: 6.2% Observed: 6.4%.
Tertiary nitrogen: Calculated: 2.12% Observed: 2.02%.

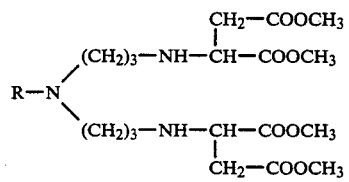

204 parts of the reaction product described above were mixed with 70 parts of methanol and 90 parts of water. 240 parts of a 20% sodium hydroxide solution were slowly added at from 70° to 80° C. and the reaction mixture was then stirred at the same temperature for one hour. 604 parts of a viscous, clear solution containing 35% of the compound corresponding to the following formula were obtained:

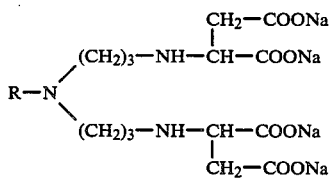

EXAMPLE 2

480 parts of 10% aqueous hydrochloric acid were added at from 20° to 30° C. to 750 parts of a 30% aqueous solution of the compound corresponding to the following formula which was described in Example 1:

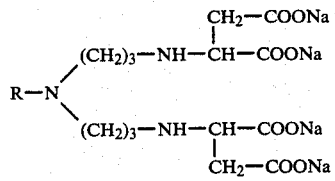

The solid obtained was suction filtered, washed with water, dispersed in 400 parts of water and dissolved by the addition of 45 parts of a 25% ammonia solution.

800 g of an aqueous solution containing 28% of the ammonium salt corresponding to the following formula were obtained:

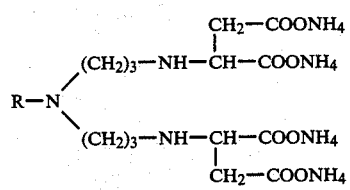

EXAMPLE 3

144 parts of dimethylmaleate were added at from 30° to 40° C. to 157 parts of a mixture of bis-(3-aminopropyl)-alkylamines corresponding to the following formula:

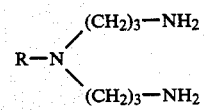

(Composition of the alkly group R in mol-%: $C_8$ alkyl 7%, $C_{10}$ alkyl 6%, $C_{12}$ alkyl 51%, $C_{14}$ alkyl 19%, $C_{16}$ alkyl 8%, $C_{18}$ alkyl 9%) and the reaction mixture was then stirred at the same temperature for 6 hours. 298 parts of a viscous liquid were obtained after clarification by filtration:

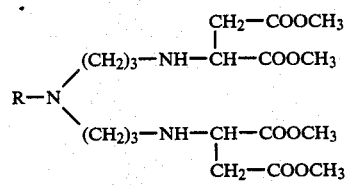

Basic nitrogen: Calculated: 6.9% Observed: 6.4%.
Tertiary nitrogen: Calculated 2.3% Observed: 2.1%.
Refractive index $n_D^{20}$ 1.4668.

280 parts of the reaction product described above were mixed with 70 parts of methanol and 170 parts of water. 372 parts of a 20% sodium hydroxide solution were added at from 50° to 60° C. and the reaction mixture was then stirred at from 70° to 80° C. for 2 hours. After removal of methanol and water by distillation, 710 parts of a highly viscous liquid containing 40% of the compound corresponding to the following formula:

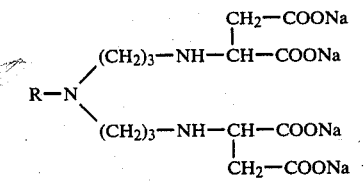

were obtained.

EXAMPLE 4

243 parts of 3-dodecyloxypropylamine prepared according to DAS No. 1,094,748, Example 3, were mixed with 10 parts of 37% hydrochloric acid, and 122 parts of acrylonitrile were then added at from 60° to 70° C. The mixture was stirred for 16 hours at from 70° to 80° C., and 180 parts of 10% sodium hydroxide solution were then added at from 45° to 50° C. The aqueous phase which separated was removed and the organic phase was freed from water and excess acrylonitrile under vacuum. 335 parts of the dicyanoethyl derivative corresponding to the following formula:

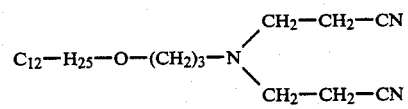

were obtained.
Basic nitrogen: Calculated: 4.0% Observed: 3.8%.
Tertiary nitrogen: Calculated: 4.0% Observed: 3.7%.

225 parts of the product described above were mixed with 50 parts of methanol, 10 parts of Raney cobalt and 100 parts of liquid ammonia and hydrogenated under a hydrogen pressure of from 100 to 120 bar in an autoclave for 5 hours at from 90° to 100° C. After removal of the catalyst by filtration, 218 parts of N,N-bis-(3-aminopropyl)-3-dodecyloxypropylamine were obtained:

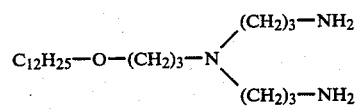

Basic nitrogen: Calculated: 11.8% Observed 11.2%.
Tertiary nitrogen: Calculated: 3.9% Observed: 3.5%.

172 parts of diethyl maleate were added dropwise at from 40° to 45° C. to 179 parts of the amine described above. 350 parts of a viscous liquid were obtained after 4 hours' stirring at the same temperature. No diethyl maleate could be detected in this liquid by thin layer chromatographic investigation:

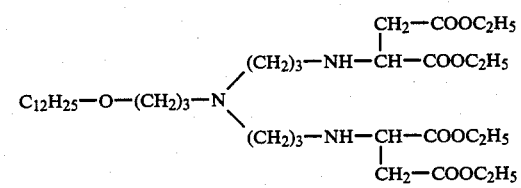

Basic nitrogen: Calculated: 5.99% Observed: 5.6%.
Tertiary nitrogen: Calculated: 1.99% Observed: 2.1%.

240 parts of a 20% sodium hydroxide solution were added dropwise at from 50° to 60° C. to a mixture of 210 parts of the compound described above, 80 parts of water and 40 parts of ethanol. The mixture was stirred for 2 hours at from 70° to 80° C. 570 parts of a clear, viscous solution containing 35% of the compound corresponding to the formula:

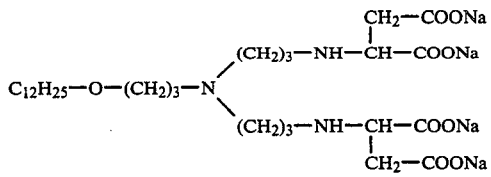

were obtained.

EXAMPLE 5

Polymerisation in the presence of an emulsifier according to the present invention The following components were introduced into a 6-liter refined steel autoclave equipped with paddle mixer (150 revs/min) and automatic internal temperature control:

Deionised water: 2032 g,
Emulsifier in the form of a 10% solution, prepared according to Example 1: 547 g,
Tertiary dodecyl mercaptan as regulator: 5.7 g.

The free space available in the autoclave was flushed with nitrogen by alternately gassing with nitrogen and evacuating.

Butadiene: 1832 g,
was finally sucked into the vacuum.

The mixture was heated to 60° C. and when the pressure and temperature became constant, polymerisation was initiated by the injection of 2.5% aqueous $K_2S_2O_8$ solution: 172.0 g, as activator solution.

The polymerisation time (in h), latex solids content (%, by weight), reaction temperature (in °C.), pressure (in bar) and pH are entered in the following Table (see Table 1).

TABLE 1

| Polymerisation time (h) | Solids content (%) | Temperature (°C.) | p (bar) | Latex pH |
|---|---|---|---|---|
| 0 | — | 60 | 8.7 | — |
| 1 | 3.5 | 60 | 8.8 | 11.5 |
| 2 | 6.0 | 60 | 8.2 | 12.1 |
| 3 | 8.7 | 60 | 7.8 | 11.9 |
| 4 | 11.0 | 60 | 7.4 | 11.9 |
| 5 | 13.0 | 60 | 7.0 | 11.7 |
| 6 | 15.0 | 60 | 6.6 | 11.7 |
| 7 | 20.0 | 60 | 6.4 | 12.1 |
| 8 | 23.0 | 62 | 6.6 | 12.1 |
| 9 | 27.0 | 62 | 6.4 | 12.1 |
| 10 | 30.0 | 62 | 5.5 | 12.1 |
| 11 | 33.5 | 67.5 | 5.2 | 12.1 |
| 12 | 36.0 | 67.7 | 3.5 | 11.8 |
| 13 | 37.5 | 67.8 | 2.2 | 11.6 |
| 14 | 38.0 | 67.9 | 1.4 | 11.5 |
| 15 | 39.0 | 67.9 | 0.8 | 11.5 |
| 16 | 39.5 | 67.9 | 0.6 | 12.0 |
| 17 | 40.0 | 67.9 | 0.4 | 11.8 |

The nominal value of the reaction temperature was altered.

After 17 hours, polymerisation was stopped by cooling to room temperature and the latex was discharged. About 4 kg of an approximately 40% crude latex were obtained. The autoclave was found to contain about 4 g of coagulate, but the latex was completely free from coagulate and no residue was left after it had been passed through a filter cloth having a 200 micrometer mesh and then through a cloth having a 30 micrometer mesh. The latex could be demonomerised without formation of foam by distilling off about 200 ml of water under vacuum at 50° C. and at the same time adding 200 ml of freshly distilled water so that the solids content remained unchanged. Degassing did not result in formation of precipitate in the latex. The demonomerized latex of approximately 40% polybutadiene dried to a clear film which underwent virtually no perceptible yellow discolouration when heated to 150° C. for 2 hours and was thus in this respect superior to a latex film produced using resin soap or potassium oleate. The latex did not form shreds of coagulate when rubbed between the fingertips, but remained smooth until it had been rubbed dry. When a similar test was carried out using other polybutadiene latices which had been prepared from the same formation, but using different emulsifiers, shreds of coagulate formed immediately when the latex was rubbed between the fingertips.

The latex having a solids content of 39.93% and pH 11.1 had an outflow time of 31.5 seconds in the outflow cup according to DIN 53 211 (100 cc dispersion, 20° C., 4 mm nozzle). The viscosity values obtained using a Brookfield viscotester of the type Synchro Lectric viscosimeter Model LVP of 1974 with spindle 2 were as follows:

6 revolutions per minute: 270 centipoises,
12 revolutions per minute: 268 centipoises,
30 revolutions per minute: 264 centipoises,
60 revolutions per minute: 255 centipoises.

The electric conductivity of the latex was about 3.6 millisiemens; by comparison, the electric conductivity of a solution of 0.746 g of potassium chloride per liter is 1.21 millisiemens. The latex could be forzen and then thawed without the formation of coarse coagulate. The particle diameter of the latex was about 60 nm according to turbidity measurements. More accurate investigation by means of an ultracentrifuge showed the following distribution:

| | |
|---|---|
| D 0:30.7 nm | DAN: 44.2 nm (nanometer) |
| D 10:35.8 | DAL: 46.5 |
| D 20:39.0 | DAF: 49.2 |
| D 30:43.0 | DAV: 53.2 |
| D 40:46.1 | DVN: 46.6 |
| D 50:49.1 | |
| D 60:52.5 | |
| D 70:56.3 | |
| D 80:60.9 | |
| D 90:68.1 | |
| D 100:about 1000 | |

The terms D 0 to D 100 refer to 0 to 100% of mass. The diameter 35.8 nm belongs to the 10th mass %, the diameter 39.6 nm to the 20th mass %, etc. The terms DAN to DVN denote average diameter of the distribution by number, average diameter of the distribution by diameter, average diameter of the distribution by surface area, average diameter of the distribution by volume and diameter to the average volume of the distribution by number. For further information on the basic concepts of particle size analysis, see DIN Standard 53 206, Sheet 1, August 1972.

Assessment of the shearing stability of the latices was carried out as follows (shear test):

500 g of latex were adjusted to pH 10 by careful addition of 5% acetic acid with stirring. The latex was then diluted to a solids content of 35%, by weight.

80 g of this 35% latex were introduced into a cylindrical metal cup having an internal diameter of 6 cm and height of 21 cm and equipped with external cooling jacket. The metal cup was embedded in a refined steel block which had a cylindrical recess and measured 13 cm in width, 13 cm in length and 5 cm in height, and the cup was secured in this block by means of a knurled beading. Distributed uniformly inside the metal cup and fixed to the walls with clamping rings were four splashboards 4 mm in width placed at rightangles to the surface of the cup and extending from the bottom to beyond the top edge of the cup.

A stirrer consisting of a simple disc 2 mm in thickness and 2 cm in diameter extended into the cup and dipped into the latex. The disc was attached to a shaft which was about 8 cm in length and increased in thickness upwards for about 5 mm near the disc. This shaft was driven by a high speed motor. The apparatus had a high precision speedometer and the speed of rotation could be accurately adjusted to a particular value, in this case 20,000 revs/min. The motor was stopped after a given length of time determined by an electronic stopwatch, in this case exactly 20 minutes. The whole apparatus was installed in a soundproof box. After the subjection to shearing stress, the contents of the metal cup were filtered through a fine sieve having a square mesh of 50 micrometers made of refined steel. The coagulate left in the sieve was dried to constant weight and reweighed.

The temperature of the latex was maintained constant during the stirring process by external cooling, measurement of the temperature in the cup and temperature control. The reproducibility of these shearing test was excellent and superior to that obtainable in known apparatus for determining the shearing stability. The apparatus used has the advantage of reliability and convenience in operation, especially regarding the ease with which it may be cleaned between operations.

According to the test described above, the amount of coagulate formed from 80 g of a 35% dispersion at 25° C. after 20 minutes of shearing stress at 20,000 revs/min was 0.34 g of coagulate, corresponding to 1.2% of coagulate based on the amount of solid substance.

When the latex having a solids content of 35% was subjected to shearing stress at pH 11–12, no coagulate was found.

EXAMPLE 6

(Comparison example)

Example 5 was repeated, except that the emulsifier according to the present invention was replaced by an equal quantity of potassium oleate as emulsifier. After the same reaction time under the same conditions, a pasty mass which was very sensitive to shearing stress was obtained. It formed shreds when rubbed between the fingertips and when tested by the shearing test under the same conditions as in Example 5 it coagulated almost completely, as well as foaming over the edge of the test vessel.

EXAMPLE 7

This is intended to demonstrate that the addition of emulsifiers according to the present invention to a dispersion prepared with the aid of known anionic emulsifiers results in a substantial improvement in the shearing stability. It also demonstrates that the addition of corresponding quantities of known anionic surface-active agents does not produce a comparable effect.

The substance used as model was a 41%, demonomerised polybutadiene latex having an average particle diameter of 110 nm. This latex was prepared by a semi-continuous inflow method at 50° C. using a total of 1.8%, by weight, of an emulsifier mixture of equal parts of potassium oleate and sodium lauryl sulphate, as well as an initiator system consisting of a redox system of a water-insoluble organic peroxide (p-menthane hydroperoxide), a water-soluble reducing agent (sodium formaldehyde sulphoxylate) and Fe-II complexanate solution.

85 g of this latex were weighed into a glass beaker. A solution of a particular emulsifier X in water (5%, by weight), shown in Table 3 below, was added with stirring. The reaction mixture was adjusted to pH 10 using 5%, by weight, ammonia solution and made up to 100 g with water. The mixture was then slowly stirred for about 30 minutes.

The stability to stirring was then determined by subjecting 80 g of the approximately 35% latices to the mechanical stress of 20,000 revs/min for 20 minutes in the apparatus described in Example 5 while the temperature of the latex was maintained at 25° C. (shearing test).

To enable the effectiveness of the various additions of emulsifiers to be compared, a comparatively small quantity ($2.22 \times 10^{-4}$ mol of emulsifier X based on 100 g of polybutadiene) was added to the test latex prior to dilution, while in another shearing test carried out independently of the first, a larger quantity ($8.57 \times 10^{-3}$ mol of emulsifier X based on 100 g of polybutadiene) was added afterwards. The effect obtained with the addition of the smaller (a) and larger (b) quantities of emulsifier is shown in the following Table 3.

TABLE 3

| Addition of X Nature of emulsifier | Addition of X Mol per 100 g of polybutadiene in the latex | Coagulate in % based on polybutadiene |
| --- | --- | --- |
| Commercial paraffin monosulphonate mixture, average chain length C 14 (comparison) | a = $2.22 \times 10^{-4}$<br>b = $8.57 \times 10^3$ | 4.1<br>3.4 |
| Sodium salt of sulphosuccinic acid dioctyl ester (comparison) | a<br>b | 3.5<br>1.2 |
| Sodium salt of p-nonylbenzene sulphonate (comparison) | a<br>b | 3.5<br>1.2 |
| Potassium laurate (comparison) | a<br>b | 3.4<br>1.4 |
| Potassium oleate (comparison) | a<br>b | 3.7<br>1.1 |
| Emulsifier according to Example 1 (according to the present invention) | a<br>b | 1.6<br>0.09 |

Table 3 shows that known commercial emulsifiers used as additives for stabilizing a polybutadiene latex are less effective against shearing stress than the emulsifiers according to the present invention.

EXAMPLE 8

(according to the present invention)

The mode of action of an emulsifier according to the present invention as in Example 1 involves the emulsion polymerisation of various monomers is now described. The following reaction mixture was prepared under nitrogen:

Water: 263 g,
Monomer (see below): 112.5 g,
Potassium peroxydisulphate: 0.526 g,
Emulsifier according to Example 1:
   (Series A): 6.56 g,
   (Series B): 1.64 g,
Polymerisation time: 7 hours,
Polymerisation temperature: 70° C.

The polymerisations were carried out in rotating flasks 500 ml in capacity protected by protective baskets. The flasks were emptied after polymerisation and the quantities of coagulate (coagulate in g), the solids content of the dispersions (F %), the pH (pH), the outflow time from the outflow cup according to DIN 53 211 (4 mm nozzle, outflow time sec.) and the average particle diameter measured by laser correlation spectroscopy (d in nm) were determined. Results:

| Monomer | Coagulate (g) | F % | pH | Outflow time (sec.) | d [nm] | Latex |
|---|---|---|---|---|---|---|
| Series 8A (using about 6% of emulsifier) | | | | | | |
| Methylacrylate | 0 | 30.61 | 7.3 | 11.2 | 118 | 8.A-1 |
| Ethylacrylate | 0.1 | 30.5 | 7.8 | 11.6 | 68 | 8.A-2 |
| Butylacrylate (Bu) | 0 | 29.8 | 8.3 | 11.5 | 72 | 8.A-3 |
| Methylmethacrylate | 0 | 30.7 | 8.2 | 11.5 | 62 | 8.A-4 |
| Butylmethacrylate | 0.09 | 30.9 | 10.0 | 11.6 | 55 | 8.A-5 |
| Styrene (S) | 0.06 | 30.9 | 11.2 | 11.7 | 55 | 8.A-6 |
| Vinyl acetate | 0.1 | 25.3 | 6.0 | 11.4 | 60 | 8.A-7 |
| Mixture 1:1 (Bu-S) | 0.16 | 30.0 | 7.1 | 11.7 | 54 | 8.A-8 |
| Acrylonitrile (ACN) | Coagulates and forms beads | | | | | |
| Mixture 1:1 (ACN-Bu) | 0.19 | 29.6 | 8.7 | 11.4 | 71 | 8.A-9 |
| Methylacrylate | 0.6 | 29.3 | 5.8 | 11.9 | 86 | 8-B-1 |
| Ethylacrylate | 0.9 | 29.4 | 5.8 | 11.8 | 81 | 8-B-2 |
| Butylacrylate | 0.3 | 29.1 | 5.6 | 11.8 | 90 | 8-B-3 |
| Methylmethacrylate | 0.2 | 29.7 | 6.2 | 11.6 | 75 | 8-B-4 |
| Butylmethacrylate | 0.9 | 29.6 | 7.1 | 11.8 | 98 | 8-B-5 |
| Styrene | 0.2 | 29.6 | 9.2 | 11.9 | 84 | 8-B-6 |
| Vinyl acetate | 0.8 | 28.6 | 4.6 | 11.4 | 135 | 8-B-7 |
| Mixture 1:1 (Bu-S) | 1.7 | 29.3 | 4.9 | 11.9 | 94 | 8-B-8 |
| Mixture 1:1 (ACN-Bu) | 1.6 | 29.1 | 6.8 | 11.9 | 85 | 8-B-9 |

The Tables of the test series A and B of Example 8 show that the pH of the various latices depend to a large extent on the monomer and on the total quantity of emulsifier used.

The quantities of coagulate occurring in test series B may be completely suppressed if a hydrogen ion acceptor, such as $NaHCO_3$ or $Na_2HPO_4$, in a quantity equivalent to the potassium peroxydisulphate used, is added.

If the latices of test series 8A (about 5.9% emulsifier, based on the polymer) are diluted to a solids content of about 20% and adjusted to pH 10 and then subjected to a shearing stress at 20,000 revolutions per minute for 20 minutes in the apparatus described in Example 5, no coagulate formation is observed.

If the latices of test series 8B (1.45% emulsifier, based on the polymer) are diluted to a solids content of 20% and adjusted to pH 10 by the addition of ammoniacal water, varying quantities of coagulate precipitate from 50 g of the dilute dispersion as shown below:

| Latex | Name | Shearing test: Quantity of coagulate (g) |
|---|---|---|
| 8-B-1 | Methyl acrylate | 0.03 |
| 8-B-2 | Ethyl acrylate | 0.11 |
| 8-B-3 | Butyl acrylate | 2.2 |
| 8-B-4 | Methyl methacrylate | 0.03 |
| 8-B-5 | Butyl methacrylate | 0.05 |
| 8-B-6 | Styrene | 4.5 |
| 8-B-7 | Vinyl acetate | 0.25 |
| 8-B-8 | Mixture Bu—S | 2.1 |
| 8-B-9 | Mixture ACN-AB | 0.06 |

EXAMPLE 9

(Comparison experiment)

The mode of action of known emulsifiers in the emulsion polymerisation of various monomers was compared with that of the emulsifiers according to the present invention. The following standard reaction mixture was polymerised:

Water: 263.0 g,
Monomer (see below): 112.5 g,
$K_2S_2O_8$: 0.526 g,
Emulsifier (see below): 5.56 g,
Polymerisation temperature: 70° C.,
Polymerisation time: 7 hours.

Polymerisation was carried out in 500 ml flasks as described above.

The emulsifier used in test series 9A was a mixture of sodium alkane sulphonates having an average chain length of 14 carbon atoms (see e.g. W. Kupfer, J. Jainz and H. Kettler, Tenside, 6, 1969, No. 1, pages 15–21) and that used in test series 9B was an emulsifier corresponding to the formula $R-O-(CH_2-CH_2-O)_{10}-SO_3NH_4$, which may be regarded as the sulphuric acid ammonium salt of a lauryl alcohol which had been reacted with 10 mol of ethylene oxide and subsequently sulphated.

The polymerised monomers, the quantity of coagulate, the solids content of the latices and the average particle diameter of the dispersions determined by laser correlation spectroscopy are shown in the Table below.

| Monomer | Coagulate (g) | Solids content % | Latex particle diameter (nm) | Name |
|---|---|---|---|---|
| Experimental Series 9A (alkane sulphonate emulsifier) | | | | |
| Methylacrylate | 0.21 | 30.5 | 195 | 9A-1 |
| Ethylacrylate | 0.15 | 30.1 | 71 | 9A-2 |
| Butylacrylate | 0.06 | 29.7 | 74 | 9A-3 |
| Methylmethacrylate | 0.04 | 31.0 | 70 | 9A-4 |
| Butylmethacrylate | 7.6 | 30.1 | 58 | 9A-5 |
| Styrene | 0.12 | 30.9 | 79 | 9A-6 |
| Mixture 1:1 Bu-S | 0.88 | 30.8 | 66 | 9A-7 |
| Mixture 1:1 ACN-Bu | 0.21 | 31.0 | 87 | 9A-8 |
| Experimental series 9B (sulphated alcohol/ethylene oxide adduct) | | | | |
| Methylacrylate | 0.04 | 30.6 | 100 | 9B-1 |
| Ethylacrylate | 0.04 | 30.9 | 88 | 9B-2 |
| Butylacrylate | 0.27 | 30.8 | 87 | 9B-3 |
| Methylmethacrylate | 0.0 | 31.2 | 75 | 9B-4 |

| Monomer | Coagulate (g) | Solids content % | Latex particle diameter (nm) | Name |
|---|---|---|---|---|
| Butylmethacrylate | 3.5 | 30.6 | 66 | 9B-5 |
| Styrene | 15.5 | 30.1 | 73 | 9B-6 |
| Mixture 1:1 Bu-S | 3.3 | 30.5 | 71 | 9B-7 |
| Mixture 1:1 ACN-Bu | 0.9 | 30.9 | 81 | 9B-8 |
| Vinyl acetate | 0.0 | 28.9 | 145 | 9B-9 |

The shearing stability of the latices of Series 9A could be determined because the dispersions foamed out of the test cup. As far as could be ascertained, the dispersions contained considerable quantities of coagulate after only a brief exposure to shearing stress.

The latices of test Series 9B foamed less and the following results were obtained after the shearing stress applied to 50 g of a 20% latex at pH ≠10:

| Latex | Name | Quantity of coagulate (g) |
|---|---|---|
| 9 B-1 | Methyl acrylate | Latex foamed over |
| 9 B-2 | Ethyl acrylate | 5.3 g of coagulate |
| 9 B-3 | Butyl acrylate | 6.0 of coagulate |
| 9 B-4 | Methyl methacrylate | 0.05 of coagulate |
| 9 B-5 | Butyl methacrylate | 8.7 of coagulate |
| 9 B-6 | Styrene | 5.5 of coagulate |
| 9 B-7 | Mixture Bu—S | 5.01 of coagulate |
| 9 B-8 | Mixture ACN-Bu | 4.15 of coagulate |
| 9 B-9 | Vinyl acetate | Latex foamed over |

A comparison of these results with those obtained from Example 8 shows the superior action of the emulsifiers according to the present invention. The latices of Series 8B from Example 8 were prepared using only about 1.45% of emulsifier, based on the quantity of polymer, and in most cases gave rise to latices having superior shearing stability compared with those of test Series 9B which contained about 6% of emulsifier, based on the polymer. A comparison between the stabilizing effects of the emulsifiers is possible because the latices from Series 8B and 9B have comparable diameters. If the particle diameters are comparable and the results obtained after exposure to shearing stress are inferior despite a much larger quantity of emulsifier (in this case ether sulphate) being provided, it may be concluded that the emulsifier in question contributes much less to the stabilization of the given dispersion than the emulsifier according to the present invention.

We claim:

1. Aminosuccinic acid derivatives corresponding to the following general formula (I):

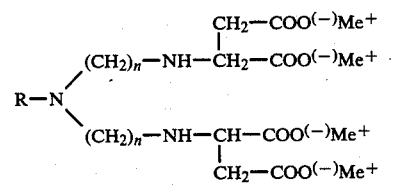

wherein

R represents an alkyl or alkenyl group having from 10 to 22 carbon atoms which may be branched and/or interrupted by one or more oxygen atoms;

n represents the number 2 or 3; and $Me^{30}$ represents hydrogen or a monovalent cation or 2 $Me^{2+}$ represents a divalent cation.

* * * * *